United States Patent [19]

Lawrence et al.

[11] Patent Number: 4,524,802
[45] Date of Patent: Jun. 25, 1985

[54] PINCH VALVE

[75] Inventors: John N. Lawrence, Whippany; István Sándor, Kinnelon, both of N.J.

[73] Assignee: Bio-Chem Valve Corp., East Hanover, N.J.

[21] Appl. No.: 655,765

[22] Filed: Oct. 1, 1984

[51] Int. Cl.³ .............................................. F16K 11/00
[52] U.S. Cl. .................. 137/595; 137/627.5; 137/863; 137/870; 137/636; 222/214; 222/504; 251/7; 251/138; 604/34; 604/250
[58] Field of Search .............. 137/636, 595, 627.5, 137/863, 870; 222/214, 504; 251/4, 7, 9, 129, 138; 604/34, 250; 128/205.24

[56] References Cited

U.S. PATENT DOCUMENTS

| | | | |
|---|---|---|---|
| 1,317,851 | 10/1919 | Arnett | 604/34 |
| 2,645,245 | 7/1953 | Marsch | 251/7 |
| 3,469,818 | 9/1969 | Cowan | 251/129 |
| 3,498,316 | 3/1970 | Pinder et al. | 251/7 |
| 3,575,161 | 4/1971 | London | 137/595 |
| 3,870,275 | 3/1975 | Kallel | 251/138 |
| 3,882,899 | 5/1975 | Ginsberg et al. | 251/7 |
| 3,895,649 | 7/1975 | Ellis | 251/9 |
| 4,230,151 | 10/1980 | Jonsson | 251/7 |

Primary Examiner—George L. Walton
Attorney, Agent, or Firm—W. Patrick Quast

[57] ABSTRACT

A novel improved pinch valve for controlling the flow of fluids in an unrestricted manner in, at least, two flexible tubes, including a housing for holding a solenoid coil between its outer wall and inner cylindrical core member. The solenoid armature is a truncated cone shape which coacts with a similarly shaped opening at the end of the inner cylindrical core member to optimize the flux path of the solenoid and thus its efficiency. A tube retention member includes openings for holding the flexible tubes. A further opening in the tube retention member holds a plunger member which is captured by a retaining pin. The plunger member is secured to the solenoid armature prior to assembly of the tube retention member to the solenoid housing. The plunger member moves with the armature as the solenoid is energized and deenergized. When the solenoid is unenergized, one of the flexible tubes is compressed between a knife like edge on the plunger member and a body portion of other tube retention member. When the solenoid is energized, the tube is now compressed between the retaining pin and the body portion of the plunger member, while the previously restricted tube becomes unrestricted. Because of the design, the alternate restriction of the tubes occurs on the axis of the valve enabling improved performance for power consumed.

6 Claims, 4 Drawing Figures

PINCH VALVE

FIELD OF THE INVENTION

This invention refers generally to valves for controlling fluid flow between alternate pairs of flexible tubing and particularly to a pinch valve arrangement which is solenoid activated.

BACKGROUND OF THE INVENTION

A number of chemical, bacteriological, medical or industrial processes require a reliable way for the alternate valving of flexible conduits carrying fluids. Further, in the analysis of body fluids such as blood or urine, it is important to have a valving arrangement which can be accurately controlled so that predictably precise samples can be analyzed. Often such control is performed automatically, at predetermined times, when the apparatus is not closely supervised.

Various types of alternating pinch valves have been developed. For example, in U.S. Pat. No. 3,895,649, a solenoid operated hose clamp for alternatingly restricting flow in a pair of flexible tubes is disclosed. Here the pair of flexible tubes are disposed in the valve between a pair of facing jaws. An arm extending from a coil spring sits between the two flexible tubes. Upon operation of the solenoid, which is coupled to the spring arm one tube or the other is alternatingly compressed allowing fluid flow through the other.

A second design is disclosed in U.S. Pat. No. 4,061,142. This is a relatively complex apparatus employing an electric motor powered valve for alternatingly blocking passage of a fluid through one of a pair of pinched tubes. A rotating clam-shell, shaped cam urges one or the other of a pair of hinged arms against a stop, pinching the flexible tube therebetween.

Still another example of a pinch valve is disclosed in U.S. Pat. No. 4,230,151. This describes a pinch valve for alternatingly closing and opening one of a pair of flexible tubes. It comprises a solenoid and plunger affixed abutment and a spring loaded, yielding abutment. The actuating member pinches one hose against the yielding abutment which normally keeps the other hose pinched, but which is thus relieved by the urging of the actuating member against the yielding abutment.

These various devices, as with others available in the marketplace are manufactured from metallic parts; relatively complex in their construction; and expensive to fabricate.

Further, the designs employing solenoids use a standard design which does not achieve an optimum throw of the actuating arm versus power consumed. Thus the solenoid design must consume relatively high amounts of power and be of a bigger size, especially where tubing wall thickness and diameter are larger.

Also the designs employing solenoids, are arranged such that one or both of the flexible tubes is offset from the axis of the solenoid plunger. This also reduces the efficiency of these prior art designs.

It is therefore a primary object of this invention to provide a new and improved valve of the type referred to above having unrestricted flow which is relatively simple in its construction; uses plastic molded parts; and which is inexpensive to fabricate.

It is another object of this invention to provide a pinch valve design employing a novel solenoid configuration which optimizes the length of stroke versus power consumed to provide a relatively efficient valve having a long stroke with low power consumption.

It is still another object of this invention to provide a valve design where both of the flexible tubes are disposed on the longitudinal axis of the solenoid actuaing arm such that efficient use of the solenoid stroke is obtained.

SUMMARY OF THE INVENTION

Towards the accomplishment of these and other objects which will become more readily apparent from a study of the accompanying drawings and following description of the preferred embodiment, a novel improved pinch valve for controlling the flow of fluids in an unrestricted manner in, at least, two flexible tubes is disclosed comprising, a housing for holding a solenoid coil between its outer wall and inner cylindrical core member. The solenoid armature is a truncated cone shape which acts with a similarly shaped opening at the end of the inner cylindrical core member to optimize the flux path of the solenoid and thus its efficiency. A tube retention member includes openings for holding the flexible tubes. A further opening in the tube retention member holds a plunger member which is captured by a retaining pin. The plunger member is secured to the solenoid housing. The plunger member moves with the armature as the solenoid is energized and deenergized. When the solenoid is unenergized, one of the flexible tubes is compressed between a knife like edge on the plunger member and a body portion of the tube retention member. The other tube is unrestricted. When the solenoid is energized, the other tube is now compressed between the retaining pin and the body portion of the plunger member, while the previously restricted tube becomes unrestricted.

BRIEF DESCRIPTION OF THE DRAWINGS

A more thorough understanding of the invention, its objects and advantages can be obtained by reading the following specification and studying the accompanying drawings. These include.

DESCRIPTION OF THE PREFERRED EMBODIMENT

Figure 1:
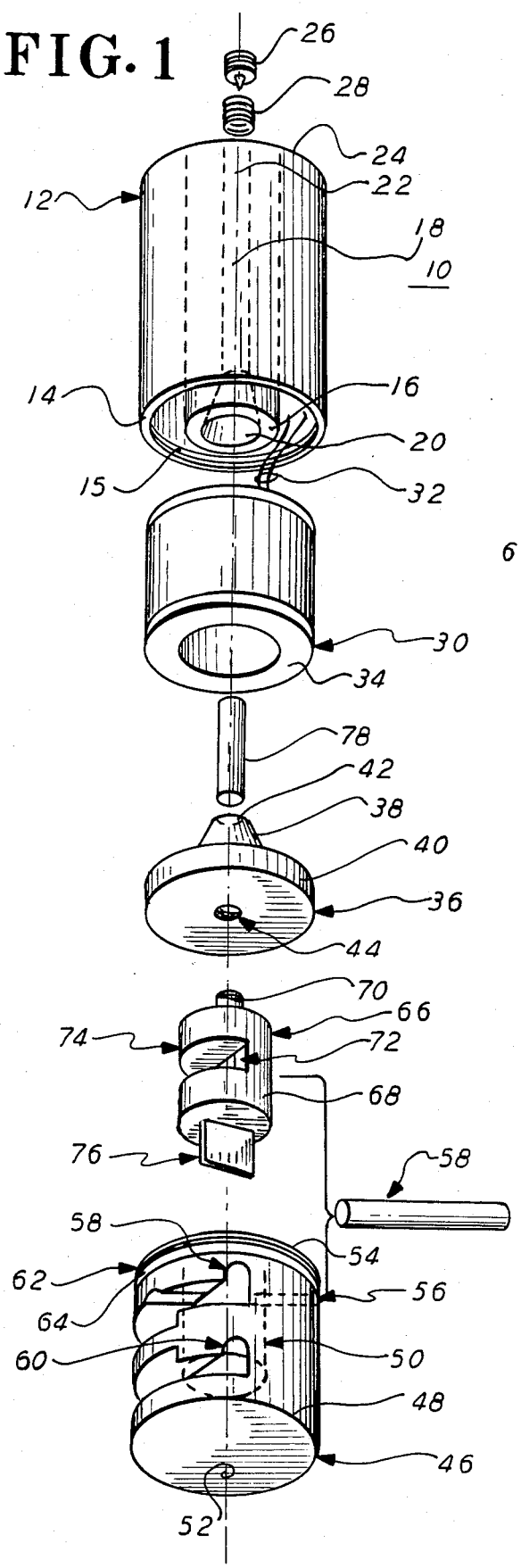
FIG. 1, which is a perspective view of an exploded version of the invention.

Referring to FIG. 1, the improved pinch valve 10 is shown in an exploded view.

A solenoid housing 12 includes an outer cylindrical wall 14; and inner cylindrical core 16. The outer wall is threaded on the inside surface at end 15. Core 16 includes a centrally disposed, longitudinally extending opening 18 and includes a first end 20 which has a truncated cone shape. The other end 22 of opening 18 passes through the end plate 24 and is internally threaded to accept access screw 26.

Access screw 26 allows adjustment of the compression force of coil spring 28 so that the necessary spring bias to effect sufficient movement of the armature is achieved.

Solenoid coil 30 including a pair of terminating wires 32 is disposed about core 16 and posited between the core and outer cylindrical wall 14. The terminating wires pass through an accommodating opening (now shown) in end plate 24. The core is secured in position by suitable means, for example, a spring clip, again not shown, pressed down over the core, and exerting retention pressure on surface 34 of the core when it is assembled in the housing.

An armature member 36 includes a conically shaped portion 38, integral with disc-shaped portion 40. Each portion includes an opening 42 and 44, which is centrally disposed along the longitudinal axis of the armature.

A tube retention member, 46, is fabricated from a plastic material. It includes a body portion 48, having a first opening 50 (best seen in FIG. 3 or 4) which is centrally disposed on the longitudinal axis 52. It passes through the top surface 54 of the member 46 and extends a portion of its longitudinal length.

A second opening 56, as depicted, is a cylindrical opening which is drilled through the sidewall on one surface of the body portion 48, through to the first opening; then, at least, partially into the sidewall on the opposite side of the first opening. The center line of hole 56 is at right angles to axis 52. This hole 56 retentatively secures pin member 58 which is press fitted into the hole during assembly as described hereinafter.

Third and fourth openings, 58 and 60, are likewise cut through the sidewalls of the body portion 48. Their respective axes are parallel to each other and, are at right angles to both axis 52 and the center line of hold 56. Openings 58 and 60 are semi-circular in shape and dimensioned to retentatively hold the flexible tube diameter to be used.

The plastic body portion is threaded on its circumference at end 62; and is ridged at this end to accept an 0-ring, 64. This seals the solenoid coil against moisture when the valve is assembled.

Plunger member, 66, is also fabricated from plastic and has a circumference diameter substantially the same as the first opening 50 of the tube retention member. The plunger member 66 includes a body portion 68 which has a first protruding member 70 centrally disposed on the longitudinal axis of the plunger. It is shaped and sized to complement opening 44 in armature member 36.

The member also includes a slotted opening 72 which extends partially along the longitudinal dimension through which pin member 58 passes when the unit is assembled. A further opening 74 is created by removing an arcuate segment from the body portion 68.

A second protruding member 76 extends from the opposite end and typically would be knife like in appearance.

In assembling the valve to the coil housing, after coil 30 is secured between core 16 and wall 14, first the plastic members are assembled. Plunger member 66 is first inserted into the opening 50 in tube retention member 46. The slotted opening 72 is aligned with the second opening 56 of member 46. Pin member 58 is then press fitted into opening 56, through slotted opening 72 and into the continuation of opening 56 in the opposite sidewall.

Opening 44 in armature member 36 is then press fitted onto protruding portion 70 of the plunger member 66.

Cylindrical, plastic piece 78 is then press fitted into opening 42 in the conically shaped portion 38 of the armature member.

The armature-tube retention assembly is then aligned such that cylindrical piece 78 enters the hollow core 16. The threaded end 62 of the tube retention member engages the threaded inside surface 15 of the solenoid housing wall 14. The armature-tube retention assembly is hand-tightened to the solenoid housing. As noted earlier, O-ring 64 forms a suitable seal to minimize moisture penetration into the coil area.

Figure 2:
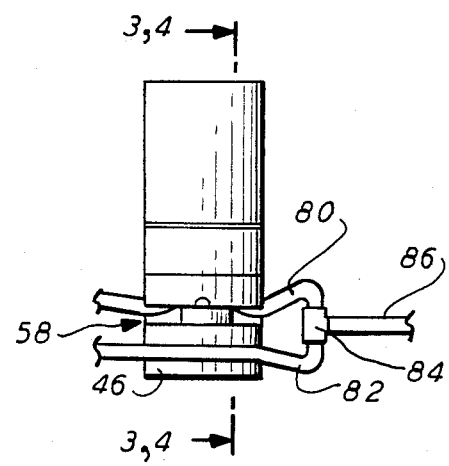
FIG. 2 is a side elevation view of the assembled valve with tubing in place.

FIG. 2 depicts a typical use of the disclosed valve. A first flexible tube 80 is pressed into the third opening 58 of member 46. A second flexible tube 82 is inserted in fourth opening 60. Typically, tubes 80 and 82 are connected through tee connection 84 to a third tube 86.

Figure 3:
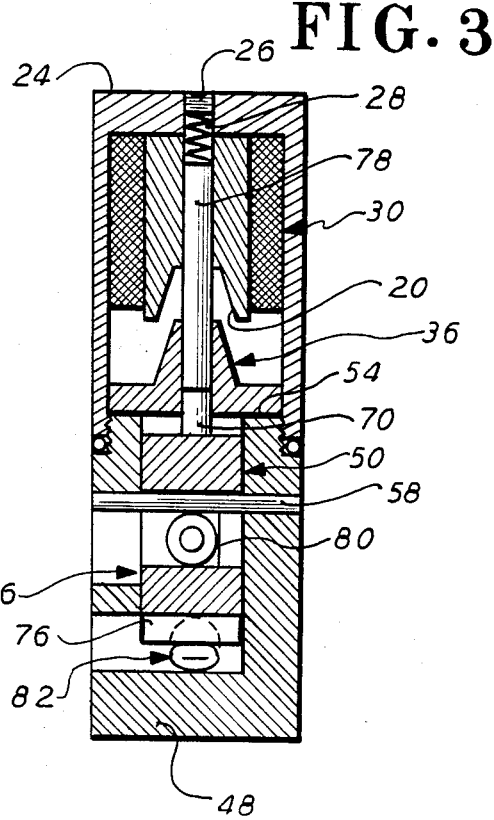
FIG. 3 is an elevation view in section taken along lines 3—3 of FIG. 2, showing the solenoid unenergized.

FIG. 3 depicts an unenergized solenoid condition. Coil spring 28 exerts a spring bias force on plastic piece 78 which, in turn, urges the armature member downward as viewed in the figure. Plunger member 66 is likewise urged downward such that protruding edge 76 compresses tube 82 against the body portion 48 of member 46. Flow in tube 82 is cut off. Slotted opening 72 is of sufficient length so that plunger member 66 can move axially a great enough distance that tube 80 becomes unrestricted and fluid flow occurs.

Figure 4:
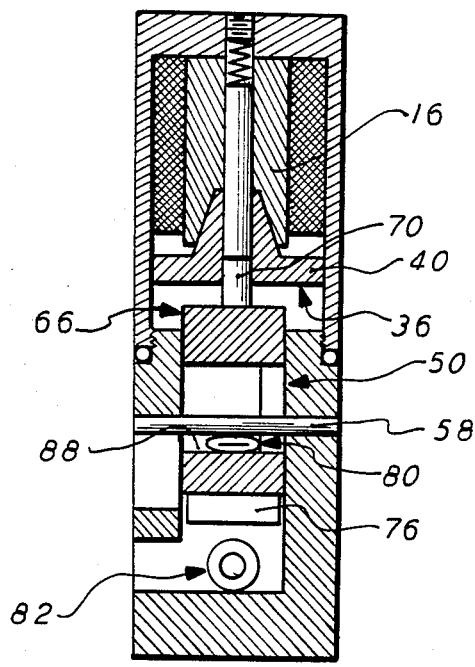
FIG. 4 is an elevation view in section taken along lines 4—4 of FIG. 2 showing the solenoid in an energized condition.

In the solenoid energized condition of FIG. 4, armature member 36 is attracted towards the core 16. The truncated cone portion of the armature and corresponding surface of the core 16 provide a complementing fit. This tapering of the armature member and corresponding contouring of the core has provided an improved flux path, apparently, since test results have shown improved armature stroke length (movement of armature between unenergized position) and energized position versus power consumed for this conical design.

When the armature member 36 is drawn towards the core 16, plunger member 66 due to its connection to the disc portion 40 of the armature, via protrusion 70, moves upward (as viewed in FIG. 4). Edge 76, now, no longer restricts tube 82. However, tube 80 is now compressed between pin 58 and flat surface 88 of body portion 68. Flow is restricted in tube 80.

The valve described, typically, is energized by twelve or twenty four volts D.C. For $2\frac{1}{2}$ inch high units, one inch diameter, power consumption is approximately three watts. A range of tube sizes of differing diameter and wall thickness can be handled. The flexible tube material, typically, is silicone.

The power typically would be applied in response to a programmed process, e.g. as to the number of energizations per unit of time and as to respective duration The longer stroke achieved by the improved armature-core shape allows the tubing to open more to provide, generally, unrestricted flow while keeping the solenoid power consumption to a minimum.

Further, both tubes are compressed in a direct line with the plunger member axis so that optimum conversion of power to compressive force is achieved.

The present invention allows for mechanical adjustment of the various members to assure complete cutoff of either tube, without damaging the tube walls. E.g., when the solenoid is energized, the tube retention member 46 can be loosened in relation to the solenoid housing by partially unthreading the two. This will enable adjustment of the restricting pressure on tube 80.

When the solenoid is unenergized, screw 26 can be adjusted to change the spring bias force exerted by spring 28 on piece 78. This, in turn, enables adjustment of the restricting pressure on tube 82. Further, protruding portion 70 of the plunger member and the corresponding opening, 44, in armature member 36 can be threaded. This, too, will enable an axial adjustment of the plunger member to effect control of the restricting pressure on tube 82.

What is claimed is:

1. An improved pinch valve for controlling the flow of fluids in an unrestricted manner in, at least, two flexible tubes, said valve comprising:

a. a solenoid housing including
  1. an outer cylindrical wall, and an inner cylindrical core including a centrally disposed longitudinally extending opening having a first and second end, said core centrally disposed within said outer cylindrical wall,
 b. a solenoid coil disposed about said core and between said core and said outer cylindrical wall, said coil terminating in a pair of wires,
 c. an armature member including centrally disposed openings on opposite faces of said armature member,
 d. a tube retention member including a body portion and having
  1. a centrally disposed first opening extending a portion of the longitudinal length of said body portion thereof,
  2. a second opening disposed at right angles to said first opening, and passing through the sidewall of said body portion at at least one point,
  3. third and fourth openings disposed at right angles to both said first and second openings in said tube retention member, said third and fourth openings sized to receive separate flexible tube members, said body portion further including means for fixedly connecting said tube retention member to said solenoid housing when said valve is assembled,
 e. a pin member,
 f. a plunger member including
  1. a body portion sized and shaped to nest in said first opening of said tube retention member when said valve is assembled, said body portion including a longitudinally extending slotted opening, said body portion having an arcuate segment removed therefrom to create an opening at right angles to both the longitudinal axis of said plunger member and said slotted opening,
  2. a first centrally disposed protruding portion extending longitudinally from one end of said body portion,
  3. a second protrouding portion extending axially from the opposite end of said body portion,
 said plunger member nesting in said first opening of said tube retention member, said plunger member slideably captured in said first opening by said pin member, said pin member passing through said longitudinally extending slotted opening said body portion when said plunger member is assembled into the second opening of said tube retention member,
 said pin member retentively held in the second opening of said tube retention member,
 the first protruding portion of said plunger member retentatively positioned in one opening in said armature member,
 g. means disposed between said second end of the longitudinally extending opening in said inner cylindrical core and the second opening in said armature member, for urging said armature member away from the first end of said inner cylindrical core to a first position when said tube retention member is secured to said solenoid housing, and when said solenoid coil is unenergized,
 said armature member attracted towards said first end of said inner cylindrical core to a second position, when said solenoid coil is energized,
 the first and second of said flexible tubes disposed in said third and fourth openings in said tube retention member respectively, said second flexible tube compressed between said second protruding portion of said plunger member and the body portion of said tube retention member, when said armature member is in said first position, whereby said first flexible tube is unrestricted, said first flexible tube compressed between the body portion of said plunger member and said pin member when said solenoid coil is energized and said armature member is in said second position,
 said plunger member coaxially aligned with said armature member and said core of said solenoid housing, such that said flexible tubes are alternatingly compressed at a point on the axis of said valve.

2. The improved valve claimed in claim 1 wherein the first end of the longitudinally extending opening in the cylindrical core has a tapered conical shape,
 said armature member including a truncated conical shape portion having the second of said centrally disposed openings therein, on the truncated face, whereby the amount of armature movement between its unenergized position and its energized position is increased per unit of power consumed.

3. An improved pinch valve for controlling the flow of fluids in an unrestricted manner, in at least, two flexible tubes, said valve comprising:

a. a solenoid housing including
  1. an outer cylindrical wall, and
  2. an inner cylindrical core including a centrally disposed longitudinally extending opening having a first and second end, said core centrally disposed within said outer cylindrical wall, said first end having a tapered conical shape,
 b. a solenoid coil disposed about said core and between said core and said outer cylindrical wall, said coil terminating in a pair of wires,
 c. an armature member including a conically shaped portion centrally disposed on a disc-shaped portion, said armature member including centrally disposed openings in each of said conically shaped and said disc-shaped portions,
 d. a tube retention member including a body portion and having
  1. a centrally disposed first opening extending a portion of the longitudinal length of said body portion thereof,
  2. a second opening disposed at right angles to said first opening, and passing through the sidewall of said body portion at at least one point,
  3. third and fourth openings disposed at right angles to both said first and second openings in said tube retention member, said third and fourth openings sized to receive separate flexible tube members, said body portion further including means for fixedly connecting said tube retention member to said solenoid housing when said valve is assembled, e. a pin member, f. a plunger member including
1. a body portion sized and shaped to nest in said first opening of said tube retention member when said valve is assembled, said body portion including a longitudinally extending slotted opening, said body portion having an arcuate segment removed therefrom to create an opening at right angles to both the longitudinal axis of said plunger member and said slotted opening,
2. a first centrally disposed protruding portion extending longitudinally from one end of said body portion,
3. a second protruding portion extending axially from the opposite end of said body portion, said plunger member nesting in said first opening of said retention member, said plunger member slideably captured in said first opening by said pin member, said pin member passing through said longitudinally extending slotted opening in said body portion when said plunger member is assembled into the second opening of said tube retention member, said pin member retentively held in the second opening of said tube retention member, the first protruding portion of said plunger member retentatively positioned in the opening in said disc-shaped portion of said armature member, g. means, disposed between said second end of the longitudinally extending opening in said inner cylindrical core and the opening in said conically shaped portion of said armature member, for urging said armature member away from the tapered conically shaped end of said inner cylindrical core to a first position when said tube retention member is secured to said solenoid housing, and when said solenoid coil is unenergized, said armature member attracted towards said tapered conically shaped end of said inner cylindrical core to a second position, when said solenoid coil is energized, the first and second of said flexible tubes disposed in said third and fourth openings in said tube retention member respectively, said second flexible tube compressed between said second protruding portion of said plunger member, and the body portion of said tube retention member when said armature member is in said first position, whereby said first flexible tube is unrestricted, said first flexible tube compressed between the body portion of said plunger member and said pin member, when said solenoid coil is energized and said armature member is in said second position, said plunger member coaxially aligned with said armature member and said core of said solenoid housing, such that said flexible tubes are alternatingly compressed at a point on the axis of said valve.

4. The valve claimed in either claim 1 or claim 3 wherein the tube retention member and the plunger member, at least, are fabricated from plastic material.

5. The valve claimed in either claim 1 or claim 3 wherein said first protruding portion of said plunger member threadingly engages the corresponding opening in said armature member, whereby said plunger member can be axially displaced in relation to said tube retention member to thereby alter the restricting pressure exerted on the second flexible tube in said fourth opening when said solenoid coil is unenergized.

6. The valve claimed in either claim 1 or claim 3 wherein said means for fixedly connecting said tube retention member to said solenoid housing, include corresponding threaded portions of each, whereby said tube retention member can be axially displaced in relation to said solenoid housing to thereby alter the restricting pressure exerted on the first flexible tube in said third opening when said solenoid coil is energized.

* * * * *